United States Patent
Jeong et al.

(10) Patent No.: US 9,591,667 B2
(45) Date of Patent: Mar. 7, 2017

(54) METHOD AND APPARATUS FOR TRANSMITTING AND RECEIVING INFORMATION FOR RANDOM ACCESS IN WIRELESS COMMUNICATION SYSTEM

(75) Inventors: Su-Ryong Jeong, Yongin-si (KR); Jeong-Ho Park, Seoul (KR); Tae-Young Kim, Seongnam-si (KR); Hyun-Kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 750 days.

(21) Appl. No.: 13/554,291

(22) Filed: Jul. 20, 2012

(65) Prior Publication Data
US 2013/0021952 A1    Jan. 24, 2013

(30) Foreign Application Priority Data

Jul. 21, 2011 (KR) ........................ 10-2011-0072254

(51) Int. Cl.
H04W 74/00 (2009.01)
H04B 7/06 (2006.01)
H04W 72/04 (2009.01)
H04B 7/08 (2006.01)
H04W 16/28 (2009.01)

(52) U.S. Cl.
CPC ........ H04W 74/006 (2013.01); H04B 7/0617 (2013.01); H04B 7/086 (2013.01); H04W 72/046 (2013.01); H04W 16/28 (2013.01)

(58) Field of Classification Search
CPC .................. H04W 74/006; H04W 74/0833
See application file for complete search history.

(56) References Cited

U.S. PATENT DOCUMENTS

| | | | | |
|---|---|---|---|---|
| 6,101,399 | A * | 8/2000 | Raleigh et al. | 455/561 |
| 8,111,679 | B2 * | 2/2012 | Tsutsui | 370/342 |
| 8,923,218 | B2 * | 12/2014 | Luo et al. | 370/329 |

(Continued)

FOREIGN PATENT DOCUMENTS

| JP | 2004-072539 A | 3/2004 |
|---|---|---|
| JP | 2009-159214 A | 7/2009 |

(Continued)

OTHER PUBLICATIONS

Gleneesha Johnson, IEEE 802.16e/Mobile WiMAX, CMSC 818Z, Mar. 6, 2007.

(Continued)

*Primary Examiner* — Ian N Moore
*Assistant Examiner* — Latresa McCallum
(74) *Attorney, Agent, or Firm* — Jefferson IP Law, LLP (57) ABSTRACT

A method and a Base Station (BS) of transmitting information for Random Access (RA) by a base station in a wireless communication system are provided. The BS generates RA information for beam alignment between the base station and each of a plurality of mobile terminals based on a number of reception beam forming patterns of the base station used for each of one or more RA channels and broadcasts the RA information to the plurality of mobile terminals. The RA information comprises information related to the number of reception beam forming patterns of the base station used for each of the one or more RA channels.

28 Claims, 7 Drawing Sheets

(56) References Cited

U.S. PATENT DOCUMENTS

| | | | |
|---|---|---|---|
| 8,971,230 B2* | 3/2015 | Ishii | H04W 74/008 370/312 |
| 2005/0111427 A1* | 5/2005 | Li et al. | 370/343 |
| 2008/0167075 A1 | 7/2008 | Kurtz et al. | |
| 2009/0042582 A1* | 2/2009 | Wang et al. | 455/450 |
| 2009/0170514 A1 | 7/2009 | Yokoyama | |
| 2009/0175161 A1 | 7/2009 | Yi et al. | |
| 2010/0067412 A1* | 3/2010 | Kitazoe et al. | 370/294 |
| 2010/0103877 A1* | 4/2010 | Wang | H04B 7/061 370/328 |
| 2010/0118716 A1 | 5/2010 | Lakkis et al. | |
| 2010/0172299 A1 | 7/2010 | Fischer et al. | |
| 2010/0220010 A1* | 9/2010 | Ko et al. | 342/373 |
| 2011/0110451 A1* | 5/2011 | Tsai | H04B 7/0617 375/267 |
| 2011/0110453 A1* | 5/2011 | Prasad et al. | 375/285 |
| 2011/0149856 A1 | 6/2011 | Son et al. | |
| 2011/0150050 A1* | 6/2011 | Trigui | H04B 7/0617 375/219 |
| 2011/0305236 A1* | 12/2011 | Morioka | H04W 74/0808 370/345 |
| 2012/0020420 A1* | 1/2012 | Sakoda et al. | 375/259 |
| 2012/0076039 A1* | 3/2012 | Kwon et al. | 370/252 |

FOREIGN PATENT DOCUMENTS

| | | |
|---|---|---|
| JP | 2011-517392 A | 6/2011 |
| KR | 10-2008-0045601 A | 5/2008 |
| WO | 2010-123237 A2 | 10/2010 |
| WO | 2010137917 A2 | 12/2010 |
| WO | 2013/039355 A2 | 3/2013 |

OTHER PUBLICATIONS

Overview of IEEE P802.16m Technology and Candidate RIT for IMT-Advanced, IEEE 802.16 IMT-Advanced Evaluation Group Coordination Meeting, Lo Jolla, CA, Jan. 13, 2010.

Yuichi Morioka, IEEE 802.11-10/0259r01, Sony Corporation, Mar. 2010.

* cited by examiner

WIDE AND COARSE BEAM

NARROW AND COARSE BEAM

NARROW AND FINE BEAM

WIDE BEAM REGION

NARROW BEAM REGION

WIDE AND NARROW BEAM
REGION OVERLAP

METHOD AND APPARATUS FOR TRANSMITTING AND RECEIVING INFORMATION FOR RANDOM ACCESS IN WIRELESS COMMUNICATION SYSTEM

PRIORITY

This application claims the benefit under 35 U.S.C. §119(a) of a Korean patent application filed on Jul. 21, 2011 in the Korean Intellectual Property Office and assigned Serial No. 10-2011-0072254, the entire disclosure of which is hereby incorporated by reference.

BACKGROUND OF THE INVENTION

1. Field of the Invention

The present invention relates to a method and an apparatus for transmitting and receiving information for random access in a wireless communication system.

2. Description of the Related Art

In wireless communication, various methods of improving the demands of data communication and supporting a high-capacity data service have recently been suggested. In order to provide a high-capacity data service in view of increased demand for data communication, a high data rate is necessary, and the use of a high carrier frequency band is needed for the high data rate. However, as the carrier frequency is higher, a transmission distance of a signal is relatively shorter, thereby generating a problem of a decrease in service coverage.

In order to address these issues, technology for providing a high-capacity wireless communication service in order to increase a transmission distance of a signal and reduce interference between a neighbor cell has been developed. Beam forming is one technology for providing a high-capacity wireless communication service.

Beam forming refers to concentrating a transmission direction of a signal to a specific direction by using one or more array antennas or horn antennas by a transmission device. With beam forming, a transmission distance of a signal is increased and a signal transmitted in a direction other than a corresponding direction is decreased, so that unnecessary signal interference is effectively reduced.

A reception device may also use a reception beam forming using a reception antenna. In reception beam forming, a direction of signal reception is concentrated to a specific direction, so that a strength of a signal received in a corresponding direction is increased, and a signal received in a direction other than the corresponding direction is removed from a reception signal, so that an unnecessary interference signal may be blocked.

As described above, beam forming expands service coverage and reduces the quantity of interference, but needs to determine a direction and a form of a beam of each of a transmission device and a reception device in order to use an optimum channel.

For example, when the transmission device is a base station and the reception device is a mobile terminal, in a process of first starting communication, such as an initial random access, by the base station and the mobile terminal, a direction of a transmission beam of the mobile terminal does not correspond to a direction of a reception beam of the base station in a case of an uplink. Accordingly, it is necessary to perform a beam alignment process between the base station and the mobile terminal before the performance of the initial random access. The beam alignment process denotes a process of aligning the direction of the transmission beam of the mobile terminal with the direction of the reception beam of the base station. The base station and the mobile terminal determine the beams forming an optimum channel by performing the beam alignment process.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting and receiving information for random access in a wireless communication system.

Aspects of the present invention provide a method and an apparatus for effectively performing random access considering a position of a mobile terminal, a channel state, and a reception signal strength in a wireless communication system using a beam forming.

Aspects of the present invention provide a method and an apparatus for minimizing a communication latency time of a mobile terminal generated due to a beam alignment process while expanding service coverage in a wireless communication system using a beam forming.

In accordance with an aspect of the present invention, a method of transmitting information for Random Access (RA) by a base station in a wireless communication system is provided. The method includes generating RA information for beam alignment between the base station and each of a plurality of mobile terminals based on a number of reception beam forming patterns of the base station used for each of one or more RA channels and broadcasting the RA information to the plurality of mobile terminals, wherein the RA information comprises information related to the number of reception beam forming patterns of the base station used for each of the one or more RA channels.

In accordance with another aspect of the present invention, a method of receiving information for RA by a mobile terminal in a wireless communication system is provided. The method includes receiving RA information for beam alignment between a base station and the mobile terminal from the base station, and determining a combination of a transmission beam forming pattern of the mobile terminal and a reception beam forming pattern of the base station to be used for the RA based on the RA information, wherein the RA information comprises information related to a number of reception beam forming patterns of the base station used for each of one or more RA channels.

In accordance with another aspect of the present invention, a base station in a wireless communication system is provided. The base station includes a controller for generating RA information for beam alignment between the base station and each of a plurality of mobile terminals based on a number of reception beam forming patterns of the base station used for each of one or more RA channels and a transmitter for broadcasting the RA information to the plurality of mobile terminals, wherein the RA information comprises information related to the number of reception beam forming patterns of the base station used for each of the one or more RA channels.

In accordance with another aspect of the present invention, a mobile terminal in a wireless communication system is provided. The mobile terminal includes a receiver for receiving RA information for beam alignment between a base station and the mobile terminal from the base station, and a controller for determining a combination of a transmission beam forming pattern of the mobile terminal and a reception beam forming pattern of the base station to be used for the RA based on the RA information, wherein the RA information comprises information related to a number of reception beam forming patterns of the base station used for each of one or more RA channels.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constitutions may be omitted for clarity and conciseness. Further, the terms used in the description are defined considering the functions of the present invention and may vary depending on the intention or usual practice of a user or operator. Therefore, the definitions should be made based on the entire contents of the description.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and an apparatus for transmitting and receiving information for Random Access (RA) in a wireless communication system are provided. Exemplary embodiments of the present specification provide a method and an apparatus for minimizing a communication latency time of a mobile terminal generated due to a beam alignment process and effectively performing the RA according to a position of a mobile terminal, a channel state, a strength of a reception signal, and the like while expanding a service coverage in a wireless communication system using a beam forming.

According to an exemplary embodiment of the present invention, a base station divides an RA channel into one or more RA sub-channels having different beam forming characteristics and transmits information on each of the one or more RA sub channels to each mobile terminal. And, according to an exemplary embodiment of the present invention, each mobile terminal may select an RA sub channel for the RA among the one or more RA sub-channels, based on a distribution of each mobile terminal, a position of a corresponding mobile terminal, a channel state between the base station and the corresponding mobile terminal, a downlink reception signal strength, etc. (hereinafter, referred to as a "communication environment of a mobile terminal"). According to an exemplary embodiment of the present invention, a shorter RA process than a RA process of the related art may be performed according to a communication environment of the mobile terminal and an RA process for the mobile terminal positioned far from the base station may be effectively performed.

Prior to describing exemplary embodiments of the present invention, a general characteristic of a beam formed signal and contents of a conventional beam alignment will be described with reference to FIG. 1A to FIG. 2C.

Figure 1A:
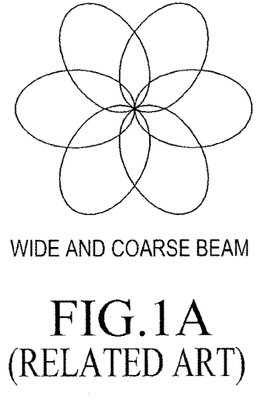
FIGS. 1A to 1C illustrate characteristics of a beam according to a beam forming according to the related art.
Figure 1B:
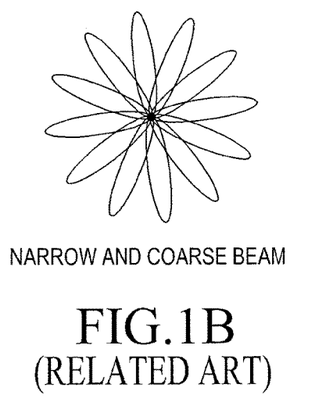
Figure 1C:
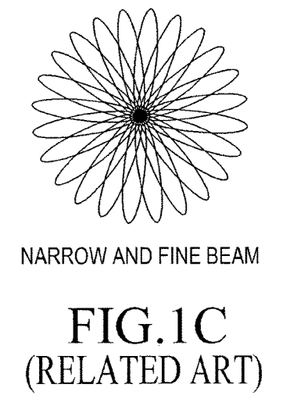

FIGS. 1A to 1C illustrate characteristics of a beam according to a beam forming according to the related art.

Referring to FIGS. 1A-1C, a characteristic of a beam in beam forming technology denotes a form of a beam formed in a reception array antenna or a horn antenna. The form of the beam may be classified into a wide or coarse beam and a narrow or fine beam according to a width and accuracy of the beam. For example, FIG. 1A illustrates a wide and coarse beam, FIG. 1B illustrates a narrow and coarse beam, and FIG. 1C illustrates a narrow and fine beam. The number of usable types of wide and coarse beam of FIG. 1A is small compared to the narrow and fine beams of FIGS. 1B and 1C.

Where a beam formed signal is transmitted or received with the same power, as a width of a beam is wider, a transmission distance of the beam formed signal is shorter.

In a similar fashion, as a width of a beam is narrow, a transmission distance of the beam formed signal is longer. This is described below with reference to FIGS. 2A to 2C.

Figure 2A:
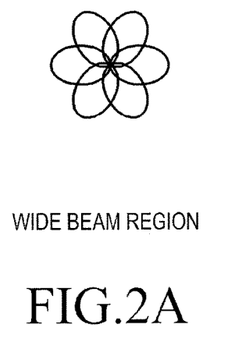
FIGS. 2A to 2C illustrate transmission distances of a beam formed signal according to a width of a beam according to an exemplary embodiment of the present invention.
Figure 2B:
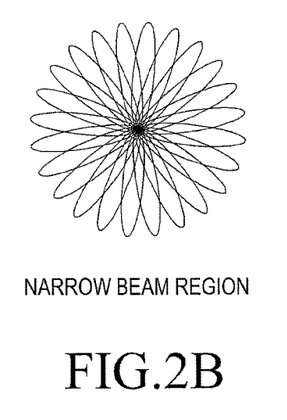
Figure 2C:
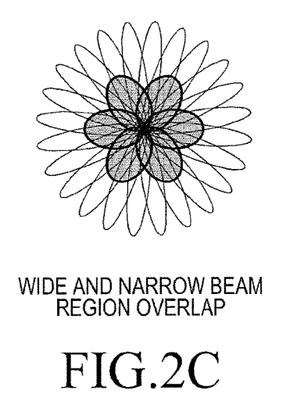

FIGS. 2A to 2C illustrate transmission distances of a beam formed signal according to a width of a beam according to an exemplary embodiment of the present invention.

Referring to FIG. 2A, the figure illustrates the beam having a relatively wide width, and FIG. 2B illustrates the beam having a relatively narrow width. When the beam illustrated in FIG. 2A overlaps with the beam illustrated in FIG. 2B, the beam is represented as illustrated in FIG. 2C. As illustrated in FIG. 2C, a transmission distance of a beam formed signal in a case of the use of the wide beam is shorter than that of a beam formed signal. Accordingly, when the base station or the mobile terminal transmits or receives a signal at a position beyond the transmission of the beam formed signal, the base station or the mobile terminal cannot perform the communication. In this case, the base station or the mobile terminal should use a finer and narrower beam.

As described above, the available types of a wide or coarse beam are fewer than those of a narrow or fine beam, and the transmission distance of the beam formed signal in a case of the use of the wide or coarse beam is shorter than that in a case of the use of the narrow or fine beam. Accordingly, the wide or coarse beam is used for transmitting/receiving a signal to/from the adjacently located mobile terminal or base station, and the narrow or fine beam is used for transmitting/receiving a signal to/from the remotely located mobile terminal or base station.

According to the aforementioned characteristics of the beam forming, if the directions of the beams of the base station and the mobile terminal do not correspond to each other, the base station and the mobile terminal cannot easily communicate. In order to communicate with each other, the base station and the mobile terminal need to perform the beam alignment process for aligning the directions of the beams of the base station and the mobile terminal. The operation of aligning the beams between the base station and the mobile terminal is called a training operation.

Figure 3A:
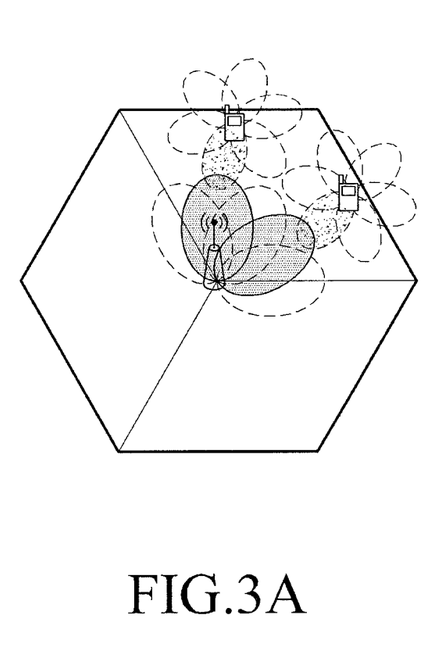
FIGS. 3A and 3B illustrate a beam alignment process of a base station and a mobile terminal according to beam forming patterns of the base station, according to an exemplary embodiment of the present invention.
Figure 3B:
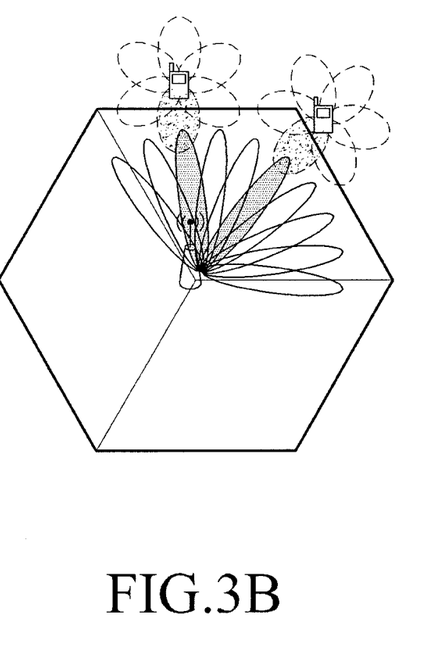

FIGS. 3A and 3B illustrate a beam alignment process between a base station and a mobile terminal according to beam forming patterns of the base station, according to an exemplary embodiment of the present invention.

Referring to FIG. 3A, the figure illustrates an example in which a base station aligns its beam and a beam of a mobile terminal by using a wide or coarse reception beam. FIG. 3B illustrates an example in which the base station aligns its beam and a beam of the mobile terminal by using a narrow or fine reception beam.

As illustrated in FIG. 3A, when the base station uses the wide or coarse beam, the number of usable types of beam is small, so that the beam alignment process may be rapidly performed. However, a transmission distance of a beam formed signal is short, so that the base station cannot communicate with a remotely located mobile terminal.

As illustrated in FIG. 3B, when the base station uses the narrow or fine beam, a transmission distance of the beam formed signal is long, so that the base station may perform the communication with a remotely located mobile terminal. However, there are many usable types of beam, so that there is a problem in that a time for the beam alignment process is long.

The beam alignment process as illustrated in FIGS. 3A and 3B may be changed according to a construction of an antenna of each base station, a size of each cell and a channel environment of each cell. For instance, if a wide or coarse beam forming is performed because the number of array antennas of a corresponding base station is small or the size of a cell which provides a service is relatively small, a communication can be performed according to the beam alignment process as illustrated in FIG. 3A.

Also, if a narrow or fine beam forming is performed because the number of array antennas of the corresponding base station is large or the size of a cell which provides a service is relatively wide, a communication can be performed according to the beam alignment process as illustrated in FIG. 3B.

According to an exemplary embodiment of the present invention, in order to support two cases illustrated in FIGS. 3A and 3B into consideration, the base station transmits RA sub channel information containing information on a characteristic of each RA sub channel as well as information on a position of a time or a frequency of each RA sub channel to each mobile terminal by using broadcast channel or a control channel.

If the base station uses a plurality of RA sub channels and characteristics of the plurality of RA sub channels are different to each other, each mobile terminal may select an RA sub channel corresponding to its communication environment from the plurality of RA sub channels by using the RA sub channel information.

For example, when a transmission distance of a beam formed signal is relatively short, a mobile terminal (i.e., a mobile terminal located in a cell center region) located relatively close to the base station has no problem in communicating with the base station. Accordingly, the base station selects an RA sub channel performing the beam forming by using a wide or coarse reception beam from the plurality of RA sub channels.

In order for a mobile terminal (i.e., a mobile terminal located in a cell edge region) located relatively far from the base station communicate with the base station, a transmission distance of the beam formed signal should be relatively long. Accordingly, the base station selects an RA sub channel performing the beam forming by using a narrow or fine reception beam from the one or more RA sub channels.

The information on a characteristic of each RA sub channel contained in the RA sub channel information contains information on the number M of reception beam forming patterns of the base station for each RA sub channel. The information related to the number of RA sub channels may contain one of information directly indicating the number of reception beam forming patterns of the base station for each RA sub channel and index information corresponding to the number of reception beam forming patterns of the base station for each RA sub channel.

When the base station transmits the information directly indicating the number of reception beam forming patterns of the base station contained in the information on a characteristic of each RA sub channel, the base station may insert additional information in the RA sub channel information and transmit the information directly indicating the number of reception beam forming patterns of the base station. The additional information may include the information on the number of RA sub channels, information on a position according to a time or a frequency of each RA sub channel, and information on the number of times of use of the same reception beam forming pattern in each RA sub channel.

When the base station and the mobile terminal index and manage the information on the number of reception beam forming patterns of the base station, the information on the number of RA sub channels, the information on a position according to a time or a frequency of each RA sub channel, and the information on the number of times of use of the same reception beam forming pattern in each RA sub channel, respectively, the base station may insert the index information corresponding to the number of reception beam forming patterns of the base station for each RA sub channel in the information on a characteristic of each RA sub channel and transmit the information. The base station need not transmit the additional information because the additional information may also be extracted based on the index information and then be used in the mobile terminal.

After the base station transmits information on the number M of reception beam forming patterns of the base station for each RA sub channel, the base station performs the reception by using M reception beam forming patterns.

The mobile terminal may recognize that the base station uses M reception beam forming patterns in the selected RA sub channel based on the information on the number of reception beam forming patterns of the base station for each RA sub channel. According to an exemplary embodiment of the present invention, the mobile terminal recognizes that the M reception beam forming patterns are sequentially used and performs the RA process considering the sequentially used reception beam forming patterns.

As described above, the information on a characteristic of each RA sub channel may further contain information on the number N of times the base station uses the same reception beam forming pattern in each RA sub channel. The information on the number N of times represents information on the number of times each reception beam forming pattern is used for each of the one or more RA sub channels within the entire time intervals for the beam alignment, and may contain, for example, three information elements.

The information on the number N of times may contain information on the number of times the base station performs the reception during preset continuous time intervals by using the respective M reception beam forming patterns in each RA sub channel. The information on the number N of times may contain information on the number of times the base station periodically performs the reception by using the same reception beam forming pattern. The information on the number N of times may contain information on the number of times the base station performs the reception by using a sequence generated based on a combination of the M reception beam forming patterns.

A case in which the number N of times contains the number of times the base station performs the reception during preset continuous time intervals by using the respective M reception beam forming patterns in each RA sub channel will be described an example. In the following description, a case in which the information on the number N of times is contained in the information on a characteristic of each RA sub channel is described, but the information on the number N of times need not contain the information on a characteristic of each RA sub channel. According to an exemplary embodiment of the invention described below, a case in which the information directly indicating the number of reception beam forming patterns of the base station is transmitted while being included in the information on a characteristic of each RA sub channel is considered. In this case, as described above, the additional information may also be transmitted while being inserted in the RA sub channel information.

The mobile terminal transmits a transmission beam to the base station by changing a direction of the transmission beam N times that the reception is repeated in one direction of the reception beam of the base station. That is, the mobile station transmits the transmission beam to the base station by changing the transmission beam forming pattern while the base station uses one of the M reception beam forming patterns N times repeatedly during a continuous time interval for each of the one or more RA channels, based on the information on the number N of times. According to the aforementioned process, the mobile terminal may detect the entire combinations of the transmission beams of the mobile terminal and the reception beams of the base station by using M and N.

M and N are set differently for each RA sub channel. Accordingly, the mobile terminal selects an RA sub channel corresponding to its communication environment based on M and N for each RA sub channel, so that the mobile terminal may efficiently perform the RA without latency even if the mobile terminal is far from the base station.

The information on a characteristic of each RA sub channel may additionally contain beam pattern information containing information on an area or accuracy of a beam used in each RA sub channel. Accordingly, the mobile terminal selects an RA sub channel appropriate for its communication environment by determining whether the base station uses the wide or coarse beam or the narrow or fine beam in each RA sub channel based on the beam pattern information on each RA sub channel.

According to an exemplary embodiment of the present invention, the RA process may be variously performed according to a characteristic of each RA sub channel. For example, the base station sequentially receives the beams by using the M reception beam forming patterns having different reception beam directions. The mobile terminal detects the entire combinations of the reception beams of the base station and the transmission beams of the mobile terminal by continuously using the transmission beam forming pattern having the same transmission beam direction M times. The mobile terminal performs the beam alignment process according to the detected combination and performs the RA process.

The plurality of RA sub channels having the different characteristics in the exemplary embodiment of the present invention may use the same physical frequency band. When the base station uses one or more array antennas or horn antennas, different reception beam forming schemes may be used in a channel of the same frequency band. As described above, even though the RA sub channel is not physically divided in the frequency band, the characteristic (i.e., M and N) of each RA sub channel should be transmitted to the mobile terminal.

The beam alignment process for the RA according to exemplary embodiments of the present invention is described below.

Figure 4A:
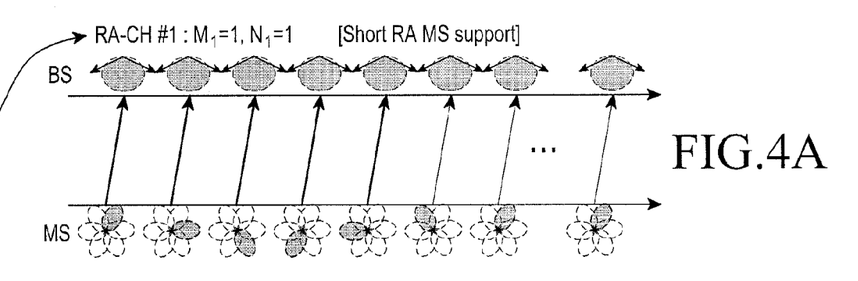
FIGS. 4A to 4C illustrate a beam alignment process for RA by using M reception beam forming patterns for each RA sub channel according to an exemplary embodiment of the present invention.
Figure 4B:
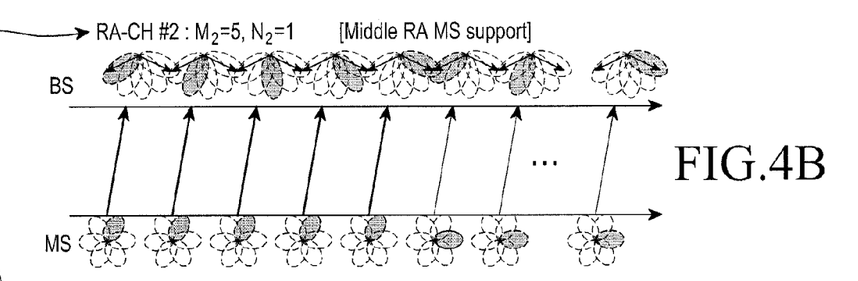
Figure 4C:
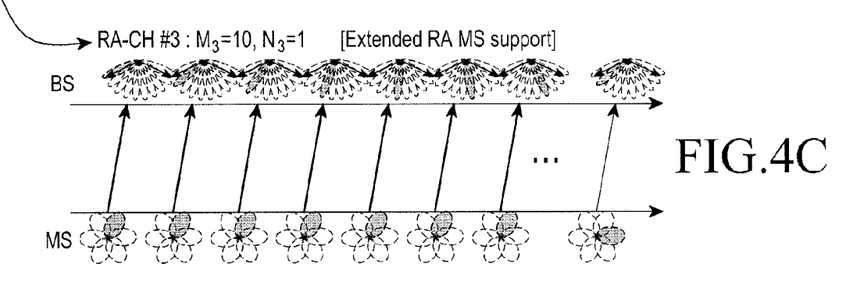

FIGS. 4A to 4C illustrate a beam alignment process for the RA using M reception beam forming patterns for each RA sub channel according to an exemplary embodiment of the present invention.

Referring to FIGS. 4A-4C, the base station divides an RA channel into one or more RA sub channels. The one or more RA sub channels are discriminated based on a frequency and have different reception beam forming characteristics. The reception beam forming characteristic, which is a characteristic of a reception beam formed through the reception beam forming, represents an area and accuracy of the reception beam. The reception beam forming characteristic is expressed by M which indicates the total number of reception beams of the base station according to a corresponding beam forming scheme. As M is larger, the reception beams of the base station are wide and coarse, and as M is smaller, the reception beams of the base station are narrow and fine.

An exemplary embodiment in which the base station divides an RA sub channel into three RA sub channels, i.e., RA-CH #1 401, RA-CH #2 402, and RA-CH #3 403, having different reception beam forming characteristics, is described below.

The RA-CH #1 401 is an RA sub channel for the RA of a mobile terminal located within a short distance RA and M is set to 1 (i.e., M1=1). Accordingly, the total number of reception beam forming patterns of the base station usable in the RA-CH #1 401 is 1. The reception beam used in the RA-CH #1 401 has a wide and coarse form.

The RA-CH #2 402 is an RA sub channel for the RA of a mobile terminal located within an intermediate distance RA and M is set to 5 (i.e., M2=5). The RA-CH #2 402 is an RA sub channel in which a reception beam forming which forms narrower and finer beams than that used in the RA-CH #1 401 is used, and the total number of reception beam forming patterns of the base station usable in the RA-CH #2 402 is 5.

The RA-CH #3 403 is an RA sub channel for the RA of a mobile terminal located within a remote distance RA and M is set to 10 (i.e., M3=10). The RA-CH #3 403 is an RA sub channel in which a reception beam forming which forms the narrowest and finest beams is used, and the total number of reception beam forming patterns of the base station usable in the RA-CH #3 403 is 10.

The mobile terminal uses the same transmission beam forming pattern during the use of the M reception beam forming patterns by the base station. The mobile terminal uses the respective transmission beam forming patterns by repeating the pattern M times. The mobile terminal calculates all combinations of the transmission beam forming patterns and the reception beam forming patterns and detects a combination of the transmission beam forming pattern and the reception beam forming pattern such that the mobile terminal has the most effective and highest reception strength.

The mobile terminal may receive information on a reception beam forming pattern by which the highest reception signal strength is detected from the base station and detect the combination of the transmission beam forming pattern and the reception beam forming pattern by using the received information. The base station may transmit the information on the reception beam forming pattern which receives a signal with the highest reception signal strength among the M reception beam forming patterns to the mobile terminal. The information on the reception beam forming pattern may be transmitted to the mobile terminal in various methods, such as transmitting the information to the mobile terminal in real time and transmitting the information to the mobile terminal when the reception of the signal from the mobile terminal is all completed. The mobile terminal may more rapidly detect the combination of the transmission beam forming pattern and the reception beam forming pattern by using the information on the reception beam forming pattern received from the base station.

When the one or more RA sub channels having the different beam forming characteristics are generated, the base station transmits RA sub channel information to each mobile terminal by using a broadcast channel or a control channel. The RA sub channel information contains the total number of RA sub channels, a position according to a time or a frequency of each RA sub channel, information on a characteristic of each RA sub channel, etc.

The base station transmits the RA sub channel information, and receives an RA signal from each mobile terminal while sequentially changing the preset M reception beam forming patterns for each RA sub channel.

The operations of the base station and the mobile terminal are described below.

The mobile terminal receives the RA sub channel information from the base station through the broadcast channel or the control channel. The mobile terminal recognizes the total number of RA sub channels, a position according to a time or a frequency of each RA sub channel, and a characteristic of each RA sub channel based on the information contained in the RA sub channel information. Subsequently, the mobile terminal selects one from the one or more RA sub channels considering its communication environment, i.e. at least one among its position, a channel state, and a reception signal strength.

When the mobile terminal is located in a cell center region, when the mobile terminal has a good channel state for the communication with the base station, or when a strength of a downlink reception signal received from the base station is equal to or larger than a threshold, the mobile terminal may select the RA-CH #1 401. When the RA-CH #1 401 is selected, the beam alignment process illustrated in FIG. 4A is performed.

Referring to FIG. 4A, the RA-CH #1 401 has M, which is set to 1, as its characteristic values. The number M of reception beam forming patterns used in the RA-CH #1 401 is 1, and the transmission beam forming pattern having the same direction is used once. Accordingly, as illustrated in FIG. 4A, the base station receives a signal from the mobile terminal by using the one reception beam forming pattern having the same direction and the mobile terminal uses the transmission beam forming pattern by changing the transmission beam forming pattern whenever the mobile terminal transmits the signal to the base station. Accordingly, whenever the one reception beam forming pattern is used in the base station, the transmission beam forming pattern of the mobile terminal is continuously changed. With the RA-CH #1 401, since the one reception beam forming pattern is used in the base station, the mobile terminal may rapidly perform the beam alignment process, resulting in minimizing an RA time.

When the RA sub channel selected by the mobile terminal is the RA-CH #2 402, the beam alignment process illustrated in FIG. 4B is performed. Referring to FIG. 4B, the RA-CH #2 402 has M, which is set to 5, as its characteristic values. The number M of reception beam forming patterns used in the RA-CH #2 402 is 5, and the transmission beam forming pattern having the same direction is repeatedly used five times. Accordingly, as illustrated in FIG. 4B, the base station receives a signal from the mobile terminal by sequentially using the five reception beam forming patterns, and the mobile terminal repeatedly uses the same transmission beam forming pattern five times during the use of the five reception beam forming patterns by the base station.

When the RA sub channel selected by the mobile terminal is the RA-CH #3 403, the beam alignment process illustrated in FIG. 4C is performed. The mobile terminal may select the RA-CH #3 403 when the mobile terminal is located in a cell edge region, when the mobile terminal has a bad channel state for the communication with the base station, or when a strength of a downlink reception signal received from the base station is less than a threshold. Referring to FIG. 4C, the RA-CH #3 403 has M, which is set to 10, as its characteristic values. The number M of reception beam forming patterns used in the RA-CH #3 403 is 10, and the transmission beam forming pattern having the same direction is repeatedly used ten times whenever the ten reception beam forming patterns are used. Accordingly, as illustrated in FIG. 4C, the base station receives a signal from the mobile terminal by sequentially using the ten reception beam forming patterns, and the mobile terminal repeatedly uses the same transmission beam forming pattern ten times during the use of the ten reception beam forming patterns by the base station.

Since the aforementioned beam alignment process is performed using only the value of M, the value of N illustrated in FIGS. 4A and 4B may be used as a value instructing the use of the M same transmission beam forming patterns during the use of the M reception beam forming patterns by the base station or may be omitted.

A beam alignment process for RA according to another exemplary embodiment of the present invention is described below.

Figure 5A:
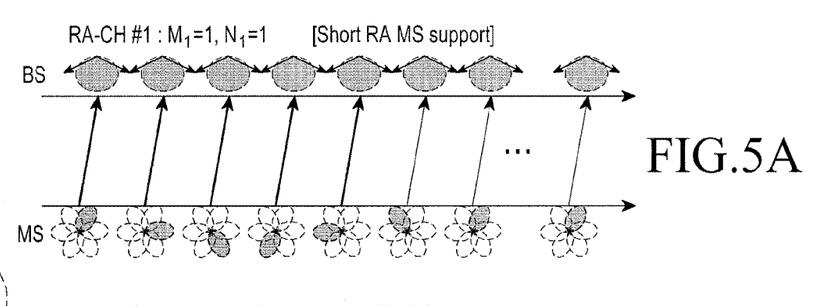
FIGS. 5A to 5C illustrate a beam alignment process for RA using the number M of reception beam forming patterns for each RA sub channel and the number N of times of repeated use of each of M reception beam forming patterns according to an exemplary embodiment of the present invention.
Figure 5B:
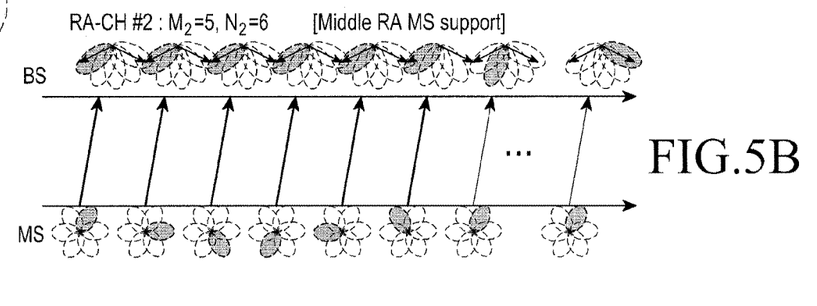
Figure 5C:
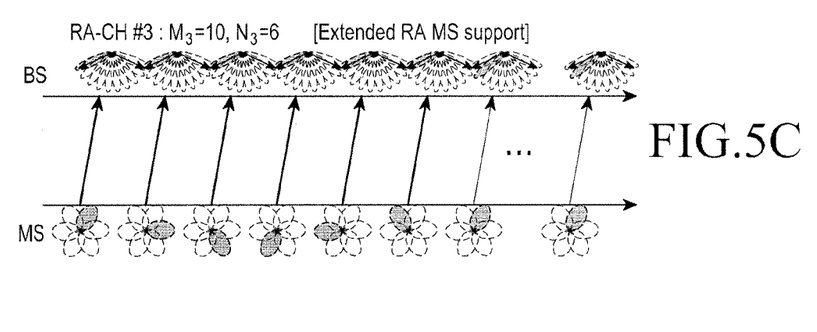

FIGS. 5A to 5C illustrate a beam alignment process for RA using the number M of reception beam forming patterns for each RA sub channel and using the number N of times of repeated use of each of M reception beam forming patterns according to an exemplary embodiment of the present invention.

A case in which the RA channel is divided for each frequency according to a Frequency Division Duplex (FDD) scheme has been described above with reference to FIGS. 4A to 4C. However, the RA channel may be divided based on a time in accordance with a Time Division Duplex (TDD) scheme according to another exemplary embodiment of the present invention.

Referring to FIGS. 5A-5C, a case in which the base station divides an RA channel into three RA sub channels, i.e. RA-CH #1 501, RA-CH #2 502, and RA-CH #3 503, having different reception beam forming characteristics according to a time is described below.

The RA-CH #1 501 is an RA sub channel for the RA of a mobile terminal located within a short distance RA and M and N are set to 1, respectively (i.e. M1=1, N1=1). Since the total number of reception beam forming patterns of the base station usable in the RA-CH #1 501 is one, one reception beam forming pattern is repeatedly used in the base station. The reception beam used in the RA-CH #1 501 has a wide and coarse form.

The RA-CH #2 502 is an RA sub channel for the RA of a mobile terminal located within an intermediate distance RA, and M is set to 5 and N is set to 6 (i.e. M2=5, N2=6). The RA-CH #2 502 is an RA sub channel in which a reception beam forming which forms narrower and finer beams than that of the RA-CH #1 501 is used. The total number of reception beam forming patterns of the base station usable in the RA-CH #2 502 is 5 and the number of times of repeated use of each of the five reception beam forming patterns is 6.

The RA-CH #3 503 is an RA sub channel for the RA of a mobile terminal located within a remote distance RA, and M is set to 10 and N is set to 6 (i.e., N2=6). The RA-CH #3 503 is an RA sub channel in which a reception beam forming having the narrowest and finest beam is used. The total number of reception beam forming patterns of the base station usable in the RA-CH #3 503 is 10 and the number of times of repeated use of each of the ten reception beam forming patterns is 6.

When the mobile terminal selects the RA-CH #1 501, the beam alignment process illustrated in FIG. 5A is performed. Referring to FIG. 5A, the RA-CH #1 501 has M and N, each of which is set to 1, as its characteristic values. The number M of reception beam forming patterns used in the RA-CH #1 501 is 1, and the number N of times of the repeated use of each of the M reception beam forming patterns is 1. Accordingly, as illustrated in FIG. 5A, the base station receives a signal from the mobile terminal by using the one reception beam forming pattern having the same direction, and the mobile terminal uses the transmission beam forming pattern by changing the transmission beam forming pattern whenever the mobile terminal transmits the signal to the base station. Whenever the one reception beam forming pattern is used in the base station, the mobile terminal uses the transmission beam forming pattern by changing the transmission bean forming pattern each time. In a case of the use of the RA-CH #1 501, since the one reception beam forming pattern is used in the base station, the mobile terminal may rapidly perform the beam alignment process, resulting in minimizing an RA time.

When the RA sub channel selected by the mobile terminal is the RA-CH #2 502, the beam alignment process illustrated in FIG. 5B is performed. Referring to FIG. 5B, the RA-CH #2 502 has M which is set to 5 and N which is set to 6, as its characteristic values. The number M of reception beam forming patterns used in the RA-CH #2 502 is 5, and the number N of times of the repeated use of each of the M reception beam forming patterns is 6. Accordingly, as illustrated in FIG. 5B, the base station receives a signal from the mobile terminal by repeatedly using each of the five reception beam forming patterns six times, and the mobile terminal uses the transmission beam forming pattern by changing the transmission beam forming pattern whenever the mobile terminal transmits the signal to the base station.

When the RA sub channel selected by the mobile terminal is the RA-CH #3 503, the beam alignment process illustrated in FIG. 5C is performed. When the mobile terminal is located in a cell edge region, when the mobile terminal has a bad channel state for communication with the base station, or when a strength of a downlink reception signal received from the base station is less than a threshold, the mobile terminal may select the RA-CH #3 503. Referring to FIG. 5C, the RA-CH #3 503 has M which is set to 10 and N which is set to 6, as its characteristic values. The number M of reception beam forming patterns used in the RA-CH #3 503 is 10, and the number N of times of the repeated use of each of the M reception beam forming patterns is 6. Accordingly, as illustrated in FIG. 5C, the base station receives a signal from the mobile terminal by repeatedly using each of the ten reception beam forming patterns six times, and the mobile terminal uses the transmission beam forming pattern by changing the transmission beam forming pattern whenever the mobile terminal transmits the signal to the base station.

As described above, according to exemplary embodiments of the present invention, the base station divides an RA channel into one or more RA sub channels, and the mobile terminal selects one from the one or more RA sub channels according to its communication environment and uses the selected RA sub channel, so that a time consumed for the beam alignment may be advantageously minimized.

An operation of the base station according to an exemplary embodiment of the present invention is described below with reference to FIG. 6.

Figure 6:
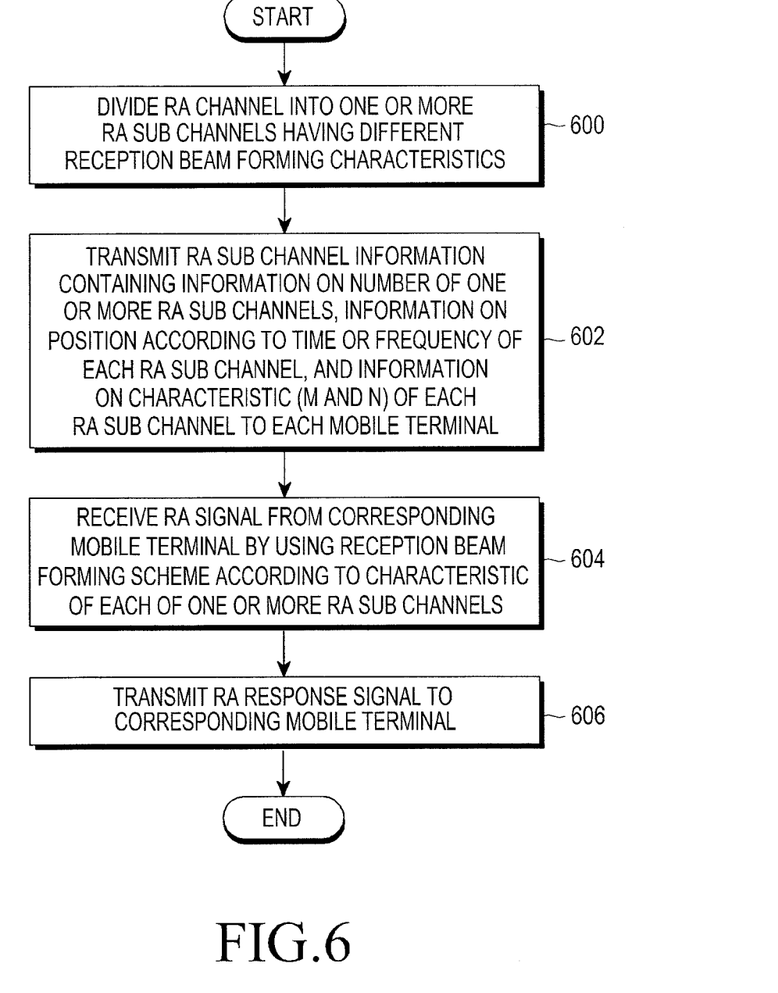
FIG. 6 is a flowchart illustrating an operation of a base station according to an exemplary embodiment of the present invention.

FIG. 6 is a flowchart illustrating an operation of the base station according to an exemplary embodiment of the present invention.

Referring to FIG. 6, the base station divides an RA channel into one or more RA sub channels having different reception beam forming characteristics in step 600. The base station transmits RA sub channel information containing information on the number of one or more RA sub channels, information on a position according to a time or a frequency of each RA sub channel, and information on a characteristic (i.e. M and N) of each RA sub channel to each mobile terminal by using a broadcast channel or a control channel in step 602.

The base station receives an RA signal from a corresponding mobile terminal by using a reception beam forming scheme according to a characteristic of each of the one or more RA sub channels in step 604. Subsequently, the base station transmits an RA response signal in response to the RA signal to the corresponding mobile terminal in step 606, to perform an RA process.

An operation of the mobile terminal according to an exemplary embodiment of the present invention is described below with reference to FIG. 7.

Figure 7:
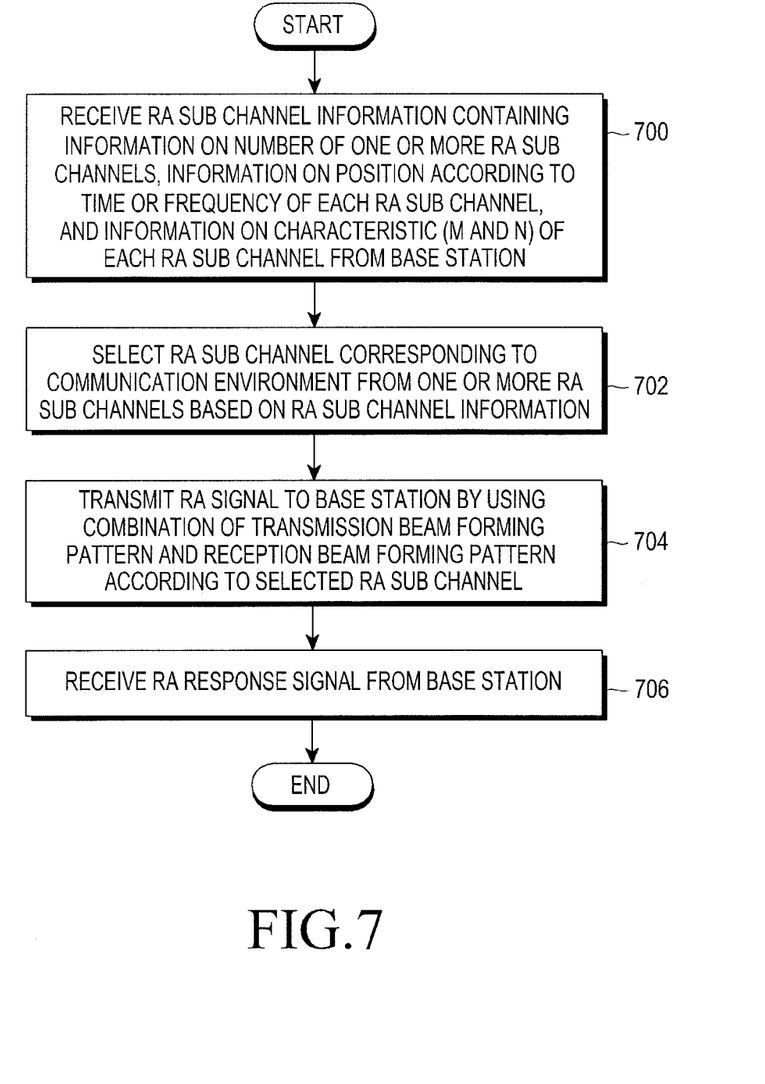
FIG. 7 is a flowchart illustrating an operation of a mobile terminal according to an exemplary embodiment of the present invention.

FIG. 7 is a flowchart illustrating an operation of the mobile terminal according to an exemplary embodiment of the present invention.

Referring to FIG. 7, the mobile terminal receives RA sub channel information containing information on the number of one or more RA sub channels, information on a position according to a time or a frequency of each RA sub channel, and information on a characteristic (i.e., M and N) of each RA sub channel from the base station in step 700. The mobile terminal selects an RA sub channel corresponding to its communication environment from the one or more RA sub channels by using the RA sub channel information in step 702.

The mobile terminal transmits an RA signal to the base station by using a combination of the transmission beam forming pattern and the reception beam forming pattern according to the selected RA sub channel in step 704. In step 704, the mobile terminal performs the beam alignment process by using the method illustrated in FIGS. 4A to 4C or FIGS. 5A to 5C. The mobile terminal transmits the RA signal by using the combination of the transmission beam forming pattern and the reception beam forming pattern, which aligns a direction of the transmission beam of the mobile terminal with a direction of the reception beam of the base station, detected through the beam alignment progress.

The mobile terminal receives an RA response signal in response to the RA signal from the base station in step 706. The RA response signal may contain information on the best beam between the mobile terminal and the base station, i.e. information on the combination of the transmission beam forming pattern and the reception beam forming pattern which aligns a direction of the transmission beam of the mobile terminal with a direction of the reception beam of the base station.

According to an exemplary embodiment of the present invention, a strength of a downlink reception signal received from the base station may be used as a reference for selecting the RA sub channel by the mobile terminal performed in step 702. When the strength of the downlink reception signal is equal to or larger than a threshold, it is determined that the mobile terminal is adjacent to the base station or a channel state for the communication between the mobile terminal and the base station is good. Accordingly, the mobile terminal selects the RA sub channel having a small value of M such that a latency time may be minimized and the RA may be rapidly performed.

When the strength of the downlink reception signal is smaller than the threshold, it is determined that the mobile terminal is located far from the base station or a channel state for the communication between the mobile terminal and the base station is not good. Accordingly, the mobile terminal selects the RA sub channel having a large value of M, in which the narrower and finer reception beam forming pattern is used, such that the mobile terminal may perform the RA process even at a more distant position.

A reference for selecting the RA sub channel may be a characteristic of a data service of the mobile terminal. When the mobile terminal requires the data service having a short latency even though a signal quality is bad, the mobile terminal selects the RA sub channel having a small value of M. When it is necessary for the mobile terminal to perform the high-capacity data transmission, the mobile terminal selects the RA sub channel, in which the finer beam is used, such that even if latency is generated, a high channel characteristic is achieved by using the RA sub channel having a large value of M.

The mobile terminal may select the RA sub channel by using a preset method. For example, the mobile terminal may select the RA sub channel in an order from the RA sub channel in which the value of M is small and the latency is low in an attempt to perform the first RA to the RA sub channel having a large value of M, or in a reverse order from the RA sub channel having a large value of M to the RA sub channel having a small value of M.

In addition, the mobile terminal may select the RA sub channel by using various methods, such as by considering a hardware characteristic of the mobile terminal or according to an instruction of the base station.

A construction of the base station according to an exemplary embodiment of the present invention is described below with reference to FIG. 8.

Figure 8:
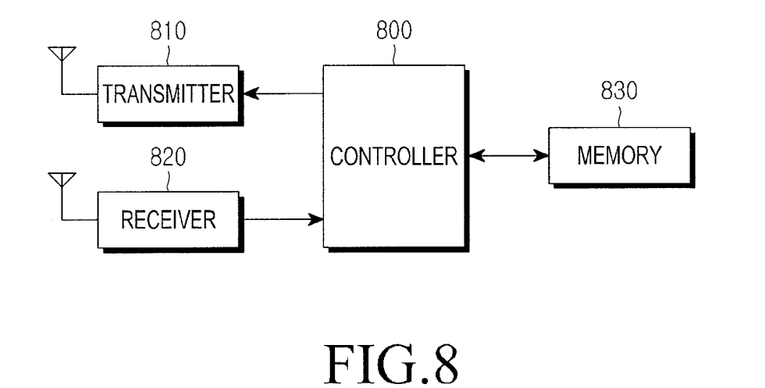
FIG. 8 is a block diagram illustrating a base station according to an exemplary embodiment of the present invention.

FIG. 8 is a block diagram illustrating the base station according to an exemplary embodiment of the present invention.

Referring to FIG. 8, the base station includes a controller 800, a transmitter 810, a receiver 820, and a memory 830.

The controller 800 controls a general operation of the base station, and controls the transmitter 810, the receiver 820, and the memory 830.

The controller 800 divides an RA channel into one or more RA sub channels having different reception beam forming characteristics. The controller 800 stores RA sub channel information containing information on the number of one or more RA sub channels, information on a position according to a time or a frequency of each RA sub channel, and information on a characteristic (i.e. M and N) of each RA sub channel in the memory 830. The controller 800 transmits the RA sub channel information to each mobile terminal by controlling the transmitter 810.

The controller 800 receives an RA signal from the mobile terminal by using a reception beam forming scheme in accordance with a characteristic of each of the one or more RA sub channels by controlling the receiver 820. Subsequently, the controller 800 performs an RA process by transmitting an RA response signal in response to the RA signal to the mobile terminal through the control of the transmitter 810.

The transmitter 810 and the receiver 820 are elements for communicating with the mobile terminal. The transmitter 810 transmits the RA sub channel information to the mobile terminals under the control of the controller 800 and transmits the RA response signal to the mobile terminal transmitting the RA signal. The receiver 820 receives the RA signal from a specific mobile terminal and the memory 830 stores the RA sub channel information under the control of the controller 800.

A construction of the mobile terminal according to an exemplary embodiment of the present invention is described below with reference to FIG. 9.

Figure 9:
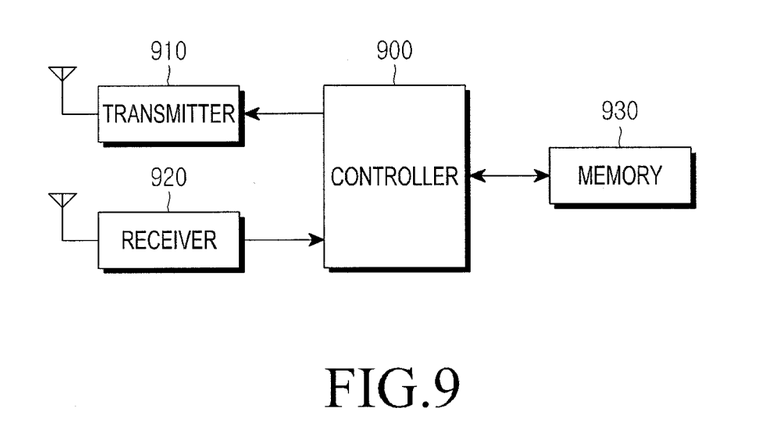
FIG. 9 is a block diagram illustrating a mobile terminal according to an exemplary embodiment of the present invention.

FIG. 9 is a block diagram illustrating the mobile terminal according to an exemplary embodiment of the present invention.

Referring to FIG. 9, the mobile terminal includes a controller 900, a transmitter 910, a receiver 920, and a memory 930.

The controller 900 controls a general operation of the mobile terminal, and controls the transmitter 910, the receiver 920, and the memory 930.

The controller 900 receives the RA sub channel information containing information on the number of one or more RA sub channels, information on a position according to a time or a frequency of each RA sub channel, and information on a characteristic (i.e. M and N) of each RA sub channel from the base station through the receiver 920. The controller 900 selects an RA sub channel corresponding to its communication environment from the one or more RA sub channels based on the RA sub channel information.

The controller 900 performs the beam alignment process according to the reception beam forming scheme of the base station in accordance with the selected RA sub channel. The controller 900 performs the beam alignment process by using the method illustrated in FIGS. 4A to 4C or FIGS. 5A to 5C. The controller 900 performs the RA process by using a combination of a transmission beam forming pattern and a reception beam forming pattern, which aligns a direction of a transmission beam of the mobile terminal with a direction of a reception beam of the base station, detected by the beam alignment process.

The controller 900 transmits the RA signal to the base station through the transmitter 910 by using the combination of the transmission beam forming pattern and the reception beam forming pattern detected by the beam alignment process. The controller 900 receives the RA response signal in response to the RA signal from the base station through the receiver 920.

The transmitter 910 and the receiver 920 are elements for communicating with the base station. The transmitter 910 transmits the RA signal to the base station and receives the RA sub channel information and the RA response signal from the base station under the control of the controller 900. The memory 930 stores the RA sub channel information under the control of the controller 900.

Accordingly, exemplary embodiments of the present invention have an effect of minimizing a communication latency time of a mobile terminal generated due to the beam alignment process in a wireless communication system using the beam forming and effectively performing the random access according to a position of a mobile terminal, a channel state, a reception signal strength, etc., while expanding a service coverage.

While the invention has been shown and described with reference to certain exemplary embodiments and drawings thereof, it will be understood by those skilled in the art that various changes of the exemplary embodiments of the present invention may be made therein without departing from the spirit and scope of the invention as defined by the appended claims and their equivalents. Accordingly, various modifications may be performed within the main spirit of the present invention defined in the claims.

What is claimed is:

1. A method for receiving random access (RA) signal by a base station in a wireless communication system, the method comprising:
   transmitting RA information to a mobile terminal, the RA information comprising information related to a number of reception beam forming patterns corresponding to one or more RA channels of the base station;
   receiving a RA signal through the reception beam forming patterns corresponding to a RA channel; and
   transmitting information related to a reception beam forming pattern and a transmission beam forming pattern with the highest signal strength,
   wherein the one or more RA channels is configured to different reception beam forming patterns;
   wherein the information related to the number of reception beam forming patterns corresponding to one or more RA channels of the base station comprises information indicating the number of reception beam forming patterns corresponding to one or more RA channels of the base station, or index information corresponding to the number of reception beam forming patterns corresponding to one or more RA channels of the base station, and
   wherein the information related to the number of reception beam forming patterns corresponding to one or more RA channels of the base station comprises information indicating the number of times the base station uses the identical reception beam forming pattern for each of the one or more RA channels.

2. The method as claimed in claim 1, wherein, if the information related to the number of reception beam forming patterns corresponding to one or more RA channels of the base station comprises the information indicating the number of reception beam forming patterns corresponding to one or more RA channels of the base station, then the RA information further comprises at least one of:
   information indicating a number of the one or more RA channels, and
   information indicating a position according to a time or a frequency for the one or more RA channels.

3. The method as claimed in claim 2, wherein the information indicating the number of times the base station uses the identical reception beam forming pattern for each of the one or more RA channels represents information indicating a number of times the base station uses each reception beam forming pattern for each of the one or more RA channels within an entire time interval for beam alignment between the base station and the mobile terminal.

4. The method as claimed in claim 3, wherein the information indicating the number of times the base station uses each reception beam forming pattern for each of the one or more RA channels comprises at least one of:
   information indicating a number of times the base station uses the identical reception beam forming pattern during a continuous time interval for each of the one or more RA channels, and
   information indicating a number of times the base station periodically uses the identical reception beam forming pattern for each of the one or more RA channels.

5. The method as claimed in claim 1, wherein the one or more RA channels comprise at least one RA channel of a plurality of RA channels divided based on one of a frequency division duplex (FDD) scheme and a time division duplex (TDD) scheme.

6. The method as claimed in claim 1, further comprising performing a reception operation based on the reception beam forming patterns corresponding to one or more RA channels of the base station in each of the one or more RA channels.

7. A method of for transmitting random access (RA) signal by a mobile terminal in a wireless communication system, the method comprising:

receiving RA information comprising information related to a number of reception beam forming patterns corresponding to one or more RA channels;

identifying a RA channel from among the one or more RA channels based on the RA information;

transmitting a RA signal through a plurality of transmission beam forming patterns to the identified RA channel; and receiving information related to a reception beam forming pattern and a transmission beam forming pattern with the highest signal strength;

wherein the one or more RA channels is configured to different reception beam forming patterns, wherein the information related to the number of reception beam forming patterns corresponding to one or more RA channels of the base station comprises information indicating the number of reception beam forming patterns corresponding to one or more RA channels of the base station, or index information corresponding to the number of reception beam forming patterns corresponding to one or more RA channels of the base station, and wherein the information related to the number of reception beam forming patterns corresponding to one or more RA channels of the base station comprises information indicating the number of times the base station uses the identical reception beam forming pattern for each of the one or more RA channels.

8. The method as claimed in claim 7, wherein, if the information related to the number of reception beam forming patterns corresponding to one or more RA channels of the base station comprises information indicating the number of reception beam forming patterns corresponding to one or more RA channels of the base station, then the RA information further comprises at least one of:

information indicating a number of one or more RA channels, and information indicating a position according to a time or a frequency for the one or more RA channels.

9. The method as claimed in claim 8, wherein the information indicating the number of times the base station uses the identical reception beam forming pattern for each of the one or more RA channels represents information indicating a number of times the base station uses each reception beam forming pattern for each of the one or more RA channels within an entire time interval for beam alignment between the base station and the mobile terminal.

10. The method as claimed in claim 9, wherein the information indicating the number of times the base station uses each reception beam forming pattern for each of the one or more RA channels comprises at least one of:

information indicating a number of times the base station uses the identical reception beam forming pattern during a continuous time interval for each of the one or more RA channels, and information indicating a number of times the base station periodically uses the identical reception beam forming pattern for each of the one or more RA channels.

11. The method as claimed in claim 8, further comprising:

transmitting a transmission beam to the base station by changing a transmission beam forming pattern of the mobile station, as many times as the number of times.

12. The method as claimed in claim 7, wherein, if the information related to the number of reception beam forming patterns corresponding to one or more RA channels of the base station comprises index information corresponding to the number of reception beam forming patterns corresponding to one or more RA channels of the base station, the RA information further comprises at least one of:

information indicating a number of times the base station uses an identical reception beam forming pattern for each of the one or more RA channels, information indicating a number of the one or more RA channels, and information indicating a position according to a time or a frequency for the one or more RA channels, corresponding to the index information.

13. The method as claimed in claim 7, wherein the RA channel is identified further based on at least one of a position of the mobile terminal, a state of a channel between the base station and the mobile terminal, and a strength of a downlink reception signal.

14. The method as claimed in claim 7, wherein the one or more RA channels comprise at least one RA channel of a plurality of RA channels divided based on one of a frequency division duplex (FDD) scheme and a time division duplex (TDD) scheme.

15. A base station in a wireless communication system, the base station comprising:

a processor configured to generate random access (RA) information comprising information related to a number of reception beam forming patterns corresponding to one or more RA channels of the base station; and a transceiver configured to transmit the RA information to a mobile terminal, receive a RA signal through the reception beam forming patterns corresponding to a RA channel and transmit information related to a reception beam forming pattern and a transmission beam forming pattern with the highest signal strength, wherein the one or more RA channels is configured to different reception beam forming patterns, wherein the information related to the number of reception beam forming patterns corresponding to one or more RA channels of the base station comprises information indicating the number of reception beam forming patterns corresponding to one or more RA channels of the base station, or index information corresponding to the number of reception beam forming patterns corresponding to one or more RA channels of the base station, and wherein the information related to the number of reception beam forming patterns corresponding to one or more RA channels of the base station comprises information indicating the number of times the base station uses the identical reception beam forming pattern for each of the one or more RA channels.

16. The base station as claimed in claim 15, wherein, if the information related to the number of reception beam forming patterns corresponding to one or more RA channels of the base station comprises the information indicating the number of reception beam forming patterns corresponding to one or more RA channels of the base station, then the RA information further comprises at least one of:

information indicating a number of the one or more RA channels, and information indicating a position according to a time or a frequency for the one or more RA channels.

17. The base station as claimed in claim 16, wherein the information indicating the number of times the base station uses the identical reception beam forming pattern for each of the one or more RA channels represents information indicating a number of times the base station uses each reception beam forming pattern for each of the one or more RA channels within an entire time interval for beam alignment between the base station and the mobile terminal.

18. The base station as claimed in claim 17, wherein the information indicating the number of times the base station uses each reception beam forming pattern for each of the one or more RA channels comprises at least one of:
information indicating a number of times the base station uses the identical reception beam forming pattern during a continuous time interval for each of the one or more RA channels, and
information indicating a number of times the base station periodically uses the identical reception beam forming pattern for each of the one or more RA channels.

19. The base station as claimed in claim 15, wherein the one or more RA channels comprise at least one RA channel of a plurality of RA channels divided based on one of a frequency division duplex (FDD) scheme and a time division duplex (TDD) scheme.

20. The base station as claimed in claim 15, wherein the transceiver is further configured to perform a reception operation based on the reception beam forming patterns corresponding to one or more RA channels of the base station in each of the one or more RA channels.

21. A mobile terminal in a wireless communication system, the mobile terminal comprising:
a transceiver configured to:
receive random access (RA) information comprising information related to a number of reception beam forming patterns corresponding to one or more RA channels of the base station,
transmit a RA signal through a plurality of transmission beam forming patterns to a RA channel to the base station, and
receiving information related to a reception beam forming pattern and a transmission beam forming pattern with the highest signal strength; and
a processor configured to:
identify the RA channel among the one or more RA channels based on the RA information,
wherein the one or more RA channels is configured to different reception beam forming patterns,
wherein the information related to the number of reception beam forming patterns corresponding to one or more RA channels of the base station comprises information indicating the number of reception beam forming patterns corresponding to one or more RA channels of the base station, or index information corresponding to the number of reception beam forming patterns corresponding to one or more RA channels of the base station, and
wherein the information related to the number of reception beam forming patterns corresponding to one or more RA channels of the base station comprises information indicating the number of times the base station uses the identical reception beam forming pattern for each of the one or more RA channels.

22. The mobile terminal as claimed in claim 21, wherein, if the information related to the number of reception beam forming patterns corresponding to one or more RA channels of the base station comprises information indicating the number of reception beam forming patterns corresponding to one or more RA channels of the base station, the RA information further comprises at least one of:
information indicating a number of the one or more RA channels, and
information indicating a position according to a time or a frequency for the one or more RA channels.

23. The mobile terminal as claimed in claim 22, wherein the information indicating the number of times the base station uses the identical reception beam forming pattern for each of the one or more RA channels represents information indicating a number of times the base station uses each reception beam forming pattern for each of the one or more RA channels within an entire time interval for beam alignment between a base station and the mobile terminal.

24. The mobile terminal as claimed in claim 23, wherein the information indicating the number of times the base station uses each reception beam forming pattern for each of the one or more RA channels comprises at least one of:
information indicating a number of times the base station uses the identical reception beam forming pattern during a continuous time interval for each of the one or more RA channels, and
information indicating a number of times the base station periodically uses the identical reception beam forming pattern for each of the one or more RA channels.

25. The mobile terminal as claimed in claim 21, wherein, if the information related to the number of reception beam forming patterns corresponding to one or more RA channels of the base station comprises index information corresponding to the number of reception beam forming patterns corresponding to one or more RA channels of the base station, the RA information further comprises at least one of:
information indicating a number of times the base station uses an identical reception beam forming pattern for each of the one or more RA channels,
information indicating a number of the one or more RA channels, and
information indicating a position according to a time or a frequency for the one or more RA channels, corresponding to the index information.

26. The mobile terminal as claimed in claim 21, wherein the processor is further configured to:
identify the RA channel from the one or more RA channels based on the RA information and at least one of a position of the mobile terminal, a state of a channel between the base station and the mobile terminal, and a strength of a downlink reception signal.

27. The mobile terminal as claimed in claim 21, wherein the one or more RA channels comprises at least one RA channel of a plurality of RA channels divided based on one of a frequency division duplex (FDD) scheme and a time division duplex (TDD) scheme.

28. The mobile terminal as claimed in claim 21, wherein the transceiver is further configured to:
transmit a transmission beam to the base station by changing a transmission beam forming pattern of the mobile station, as many times as a number of times the base station uses each reception beam forming pattern for each of the one or more RA channels within an entire time interval for the beam alignment.

* * * * *